Sept. 29, 1959　　F. R. L. DALEY, JR　　2,906,360
VEHICLE DRIVE MEANS
Filed Sept. 9, 1955　　2 Sheets-Sheet 1
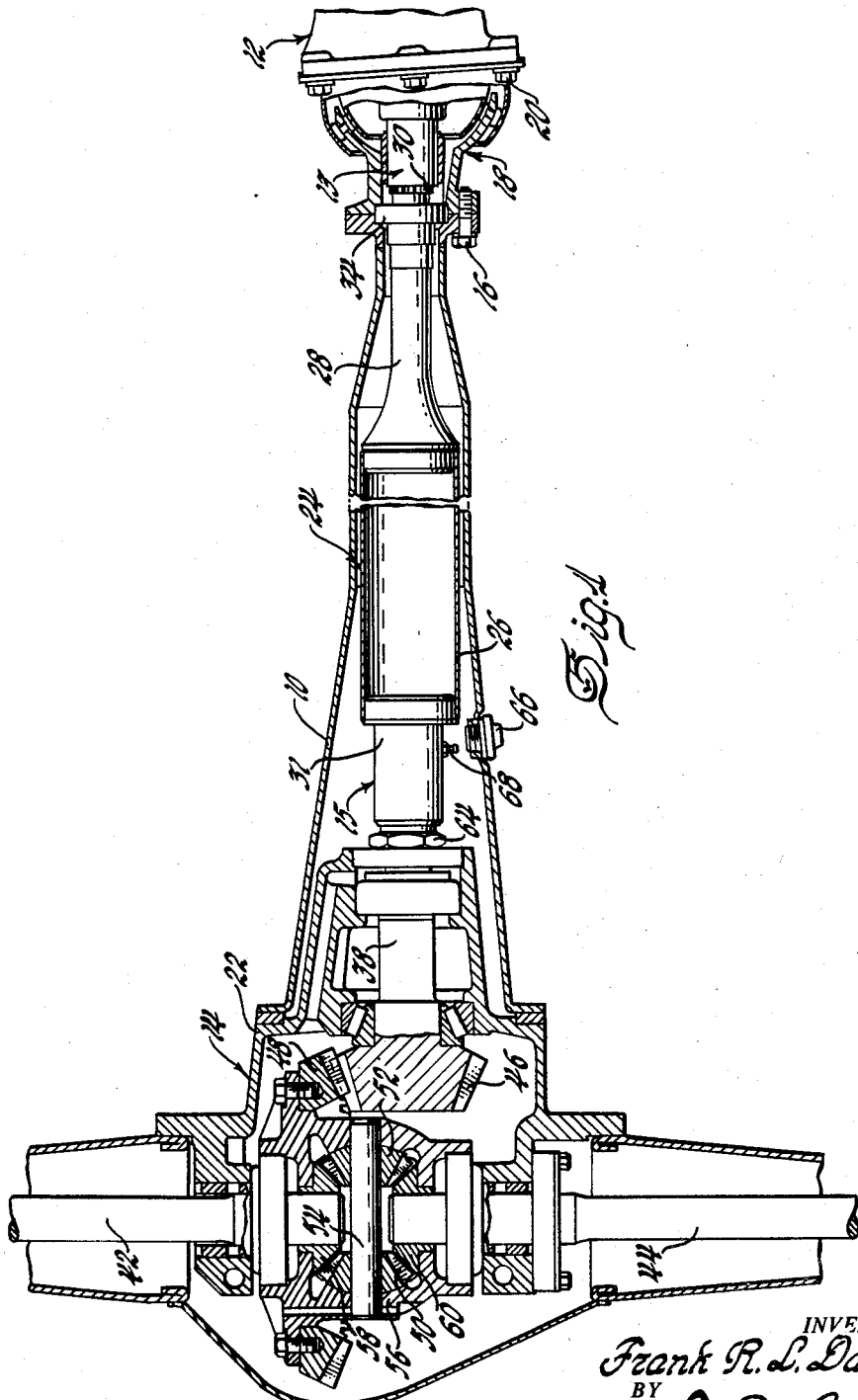
INVENTOR.
Frank R. L. Daley, Jr.
BY
L. D. Burch
ATTORNEY Sept. 29, 1959   F. R. L. DALEY, JR   2,906,360
VEHICLE DRIVE MEANS
Filed Sept. 9, 1955   2 Sheets-Sheet 2
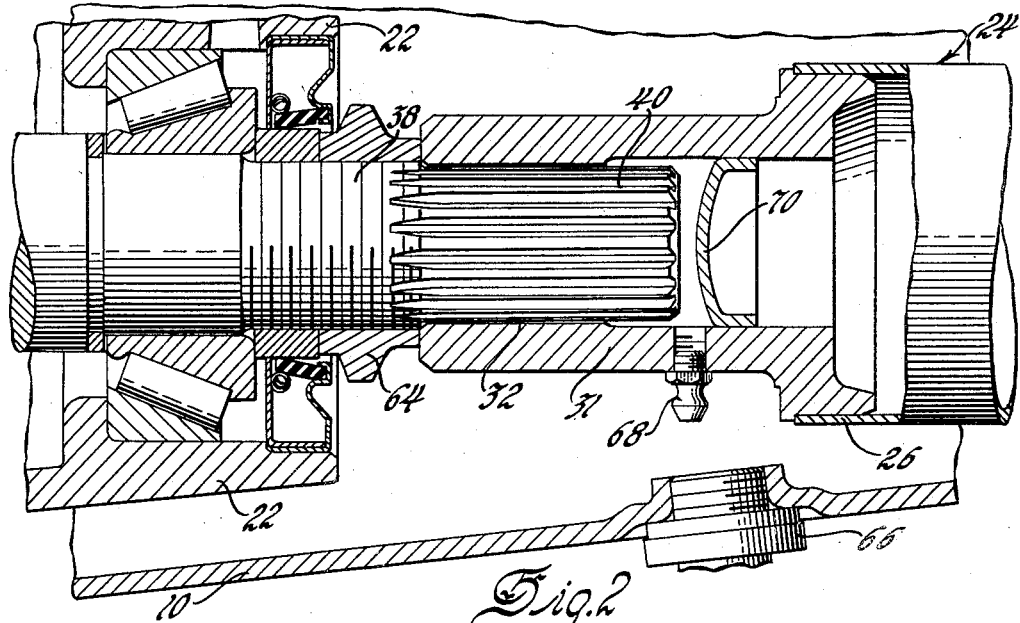
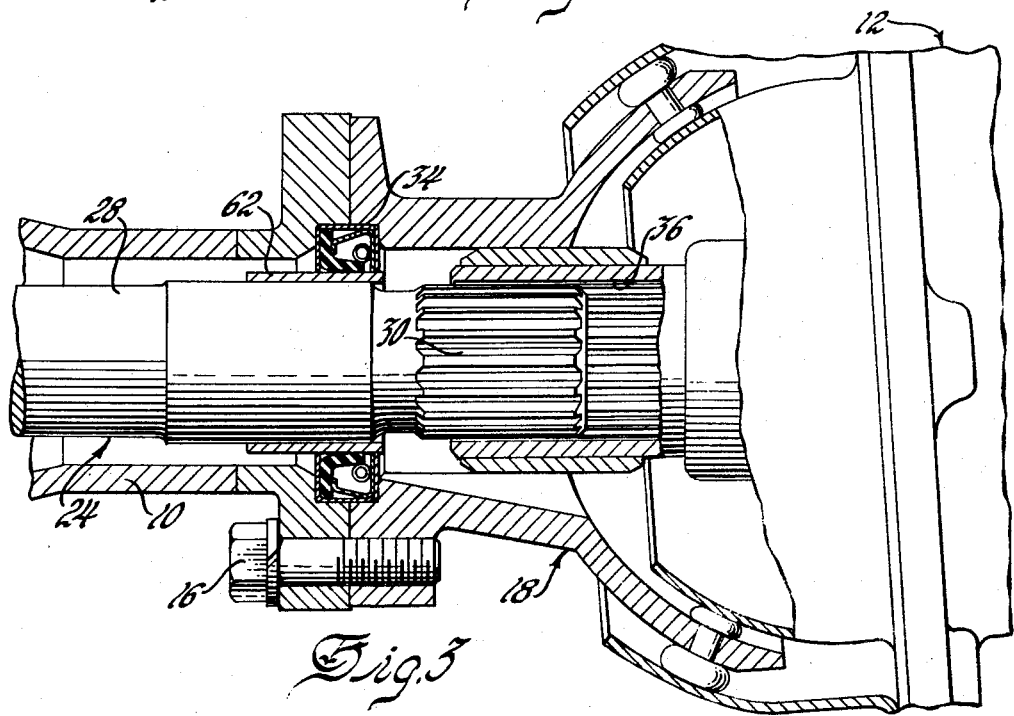
INVENTOR.
Frank R. L. Daley, Jr.
BY
L. D. Burch
ATTORNEY – # United States Patent Office 2,906,360
Patented Sept. 29, 1959

2,906,360

VEHICLE DRIVE MEANS

Frank R. L. Daley, Jr., Fenton, Mich., assignor to General Motors Corporation, Detroit, Mich., a corporation of Delaware Application September 9, 1955, Serial No. 533,353

5 Claims. (Cl. 180—70)

This invention relates to vehicle drive means generally and more particularly to drive means including features which will minimize the tendency of rear axle and other noises to be transmitted through the vehicle drive shaft to the vehicle body.

Rear axle noises originating within the differential drive unit of a motor vehicle, or from other sources, have been found to be readily transmitted through the propeller drive shaft into the vehicle body. The drive shaft being an elongated tubular member reacts similar to a sounding rod in some instances to magnify noises which are received thereby. Although automotive engineers are continually on guard to prevent noises at their source, it frequently happens that the prevention of the disturbing noise is an unwarranted expense and that despite all precautions taken, continuous use will re-introduce the same or different disturbances. Minimizing the tendency of noises to be transmitted to other parts of a vehicle or the isolation of such noises is therefore equally as important as their prevention.

It is here proposed to provide means whereby a vehicle drive shaft in a torque tube drive arrangement may be adapted to prevent or greatly reduce the tendency of rear axle and other noises to be transmitted therethrough. It is proposed to provide a sliding spline joint at each end of the propeller drive shaft to permit limited free-floating axial movement of the drive shaft. Under unusual engine load conditions, as during acceleration or braking, the torque load and frictional forces within the sliding spline joints will prevent the drive shaft from moving axially. However, during normal operation, the slight relative movement permitted the free-floating propeller drive shaft will effectively minimize the tendency of noises to be transmitted therethrough.

In the drawings:

Figure 1 is a broken cross-sectional view of a torque tube vehicle drive arrangement embodying the features of the present invention.

Figures 2 and 3 are enlarged cross-sectional views of opposite ends of the torque tube vehicle drive means shown by Figure 1.

Referring to Figure 1, the vehicle drive arrangement is shown to include a torque tube 10 extending between the transmission end of vehicle drive means 12 and a differential drive unit 14. The forward end of the torque tube 10 is secured by fastening means 16 to universal joint means 18 secured as by fastening means 20 to the housing of drive means 12. The other end of the torque tube 10 is secured directly to the housing or carrier 22 of the differential drive unit 14.

The vehicle drive shaft 24 is disposed within the torque tube 10 and is connected to drive means 12 and differential unit 14 by sliding spline joints 13 and 15. The drive shaft includes a tubular member 26 having a forwardly extending member 28 secured to one end thereof, which is externally splined at its outer end as at 30, and a rearwardly extending sleeve member 31 secured to the other end thereof, and which is internally splined as at 32. The forwardly extending end of the drive shaft passes through a seal 34 and is received within an internally splined member 36 connected to the power output end of the drive means 12. The forwardly extending end of the differential drive pinion 38, journaled within the differential carrier 22, is externally splined as at 40 and is received within the internally splined torque tube member 31.

The differential unit 14 includes the housing or carrier 22 having the pinion drive means 38 journaled within the forward end thereof and receiving axle drive shafts 42 and 44 through oppositely disposed rearwardly extending forked pedestals thereof. The gear head 46 of the differential drive means 38 drives a ring gear 48 which is journaled for rotation about one of the axle shafts 42 and includes differential gears 50 and 52 rotatably mounted upon pin means 54 within the differential gear carrier 56 and engaged with side gears 58 and 60 secured to the ends of the axle shafts 42 and 44 for driving the axle shafts in the manner of conventional and well-known differential drive arrangements.

The vehicle drive shaft 24 is thus connected by sliding spline means 13 and 15 to the driving means 12 at one end thereof and the means adapted to be driven, 14, at the other end thereof and is permitted relative axial free-floating movement between such drive and driven means. In order to provide positive limits of permissible free-floating axial movement of the drive shaft 24, a sleeve 62 is provided about the forwardly extending member 28 of the drive shaft for limiting forward axial movement to engagement thereof with the internally splined member 36 previously described. Rearward free-floating axial movement is also provided with positive limits by the engagement of the internally splined member 31 of the drive means with the lock nut means 64 securing the differential drive pinion 38 in place.

A threaded plug 66 is provided within torque tube 10 to permit access to the grease fitting 68 by means of which lubricant may be supplied the after-splined drive joint 15. Plug 70 is provided within the internally splined member 31 to retain the lubricant to the spline joint.

Under normal drive conditions the spline joints 13 and 15 permit sufficient axial relative freedom of movement of the drive shaft 24 to dissipate objectionable rear axle or other noises which would otherwise tend to be transmitted therethrough. At the same time, there is sufficient frictional engagement, especially under torque loads, to prevent undue axial movement of the drive shaft 24 as might otherwise be expected to cause the drive shaft to slam or hammer against the end of the drive means 12 or differential unit 14.

What is claimed is:

1. In a vehicle including a torque tube drive arrangement, differential drive means, vehicle driving means, and a drive shaft slip spline connected to said differential drive means and slip spline connected to said vehicle driving means, said drive shaft being shorter than the distance between the remote ends of said splines in said differential drive means and said vehicle drive means to permit limited axial freedom of movement therebetween during normal operation of said vehicle.

2. In a vehicle including a torque tube drive arrangement and having vehicle and differential drive means disposed apart in fixed spaced relation, a vehicle drive shaft having opposite ends thereof splined, and splined means provided from said vehicle and differential drive means respectively for receiving the splined ends of said drive shaft the distance between the remote ends of said splined means being greater than the length of said drive shaft to permit relative axial freedom of movement of said drive shaft between said drive means during normal operation of said vehicle.

3. Vehicle drive means including driving means and differential drive means disposed apart and having a tubular member secured therebetween, a tubular drive shaft disposed within said tubular member and having an externally splined member secured to one end thereof and an internally splined member secured to the other end thereof, an internally splined member extended from said driving means for receiving said externally splined member, and an externally splined member extended from said differential drive means for receiving said internally splined member of said drive shaft, said drive shaft being shorter than the distance between the remote ends of the splined members extending from said driving means and said differential drive means to provide sliding spline joints at opposite ends of said drive shaft permitting free floating axial movement thereof during normal operation of said vehicle drive means.

4. Vehicle drive means including a torque tube maintaining a vehicle driving means in spaced relation to a differential driving means, internally and externally splined members provided from said vehicle driving means and said differential drive means respectively, and a drive shaft disposed within said torque tube and having one end externally splined and the other internally splined to slidably engage said corresponding splined members under normal operating conditions, said drive shaft being of shorter length than the distance between the remote ends of the splines in said splined members to permit axial free floating movement of said drive shaft.

5. Vehicle drive means including a torque tube extending between driving means and driven means, a drive shaft disposed within said torque tube, slip spline connection means between said driving means and said drive shaft and said slip spline connection means between driven means and said drive shaft, and abutment means associated with said drive shaft and said driving means and said driven means and permitting free floating axial movement of said shaft within said torque tube, said abutment means limiting said axial movement of said shaft with respect to said driving and said driven means.

References Cited in the file of this patent
UNITED STATES PATENTS

| | | |
|---|---|---|
| 1,276,710 | Barsby | Aug. 27, 1918 |
| 1,355,516 | Stahl | Oct. 12, 1920 |
| 1,631,236 | Werner | June 7, 1927 |
| 1,756,335 | Bijur | Apr. 29, 1930 |
| 2,027,329 | Van Ranst | Jan. 7, 1936 |
| 2,067,287 | Pearce | Jan. 12, 1937 |
| 2,214,948 | Youngren | Sept. 17, 1940 |
| 2,311,143 | Wahlberg | Feb. 16, 1943 |
| 2,340,149 | Slack | Jan. 25, 1944 |
| 2,380,952 | Dewey | Aug. 7, 1945 |